US009338762B2

United States Patent
Diachina et al.

(10) Patent No.: US 9,338,762 B2
(45) Date of Patent: May 10, 2016

(54) EXTENDED MONITORING WINDOW FOR ROBUST PAGING

(71) Applicant: Telefonaktiebolaget L M Ericsson (publ), Stockholm (SE)

(72) Inventors: John Walter Diachina, Garner, NC (US); Paul Schliwa-Bertling, Ljungsbro (SE); Anders Christensson, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 73 days.

(21) Appl. No.: 14/263,058

(22) Filed: Apr. 28, 2014

(65) Prior Publication Data

US 2014/0323165 A1   Oct. 30, 2014

Related U.S. Application Data

(60) Provisional application No. 61/817,055, filed on Apr. 29, 2013.

(51) Int. Cl.
*H04W 68/02* (2009.01)
*H04W 24/00* (2009.01)
*H04W 8/24* (2009.01)

(52) U.S. Cl.
CPC ............... *H04W 68/02* (2013.01); *H04W 8/24* (2013.01)

(58) Field of Classification Search
CPC ........ H04W 68/02; H04W 24/00; H04W 8/24
See application file for complete search history.

(56) References Cited

U.S. PATENT DOCUMENTS

| 2006/0133269 | A1 | 6/2006 | Prakash et al. | |
| 2007/0010263 | A1* | 1/2007 | An | H04W 68/00 455/458 |
| 2009/0131083 | A1* | 5/2009 | Willey | H04W 68/00 455/458 |
| 2010/0173651 | A1 | 7/2010 | Park et al. | |
| 2011/0140846 | A1* | 6/2011 | Blanz | H04W 4/005 340/7.1 |
| 2011/0195709 | A1 | 8/2011 | Christensson | |
| 2012/0300655 | A1 | 11/2012 | Lee et al. | |
| 2013/0301501 | A1* | 11/2013 | Olvera-Hernandez | H04W 76/048 370/311 |
| 2014/0329550 | A1 | 11/2014 | Diachina et al. | |

FOREIGN PATENT DOCUMENTS

WO   WO 2009/063422   5/2009   ............ H04W 68/02

OTHER PUBLICATIONS

PCT Notification of Transmittal of the International Search Report and the Written Opinion of the International Searching Authority, or the Declaration, with attached PCT Written Opinion of the Int'l Searching Authority; International Application No. PCT/IB2014/061089, file ref No. P40577-WO1, Int'l filed Apr. 29, 2014 (9 pages), date of mailing.

* cited by examiner

*Primary Examiner* — Kashif Siddiqui
*Assistant Examiner* — Minjung Kim
(74) *Attorney, Agent, or Firm* — Baker Botts, LLP

(57) ABSTRACT

A wireless communication device communicates an extended monitoring window indicator to a core network node. The extended monitoring window indicator indicates that the wireless communication device is capable of monitoring a paging channel of a radio access node using an extended monitoring window that includes one or more paging blocks in addition to a nominal paging block associated with the wireless communication device. The extended monitoring window indicator indicates the additional paging blocks of the extended monitoring window.

30 Claims, 8 Drawing Sheets

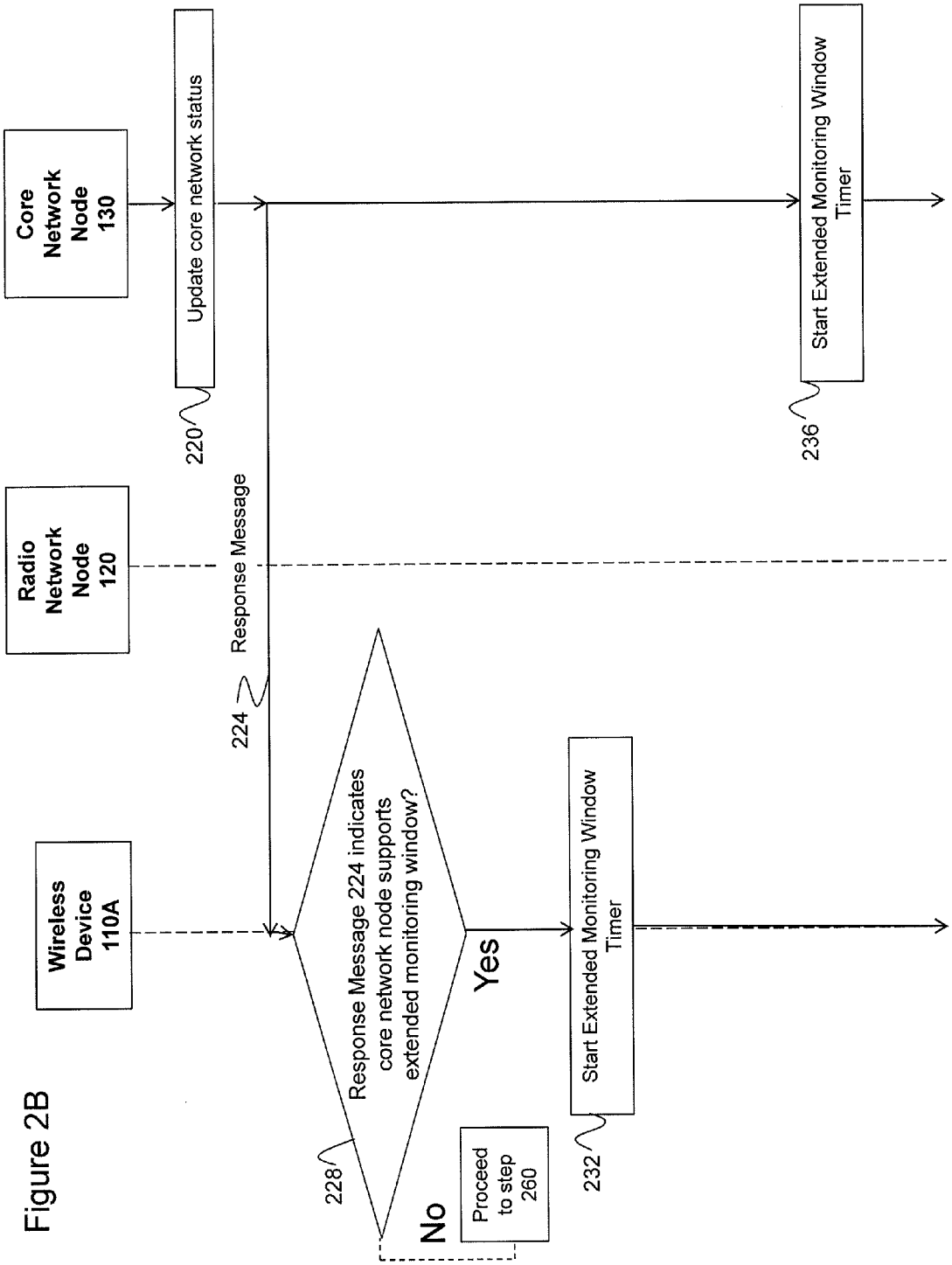

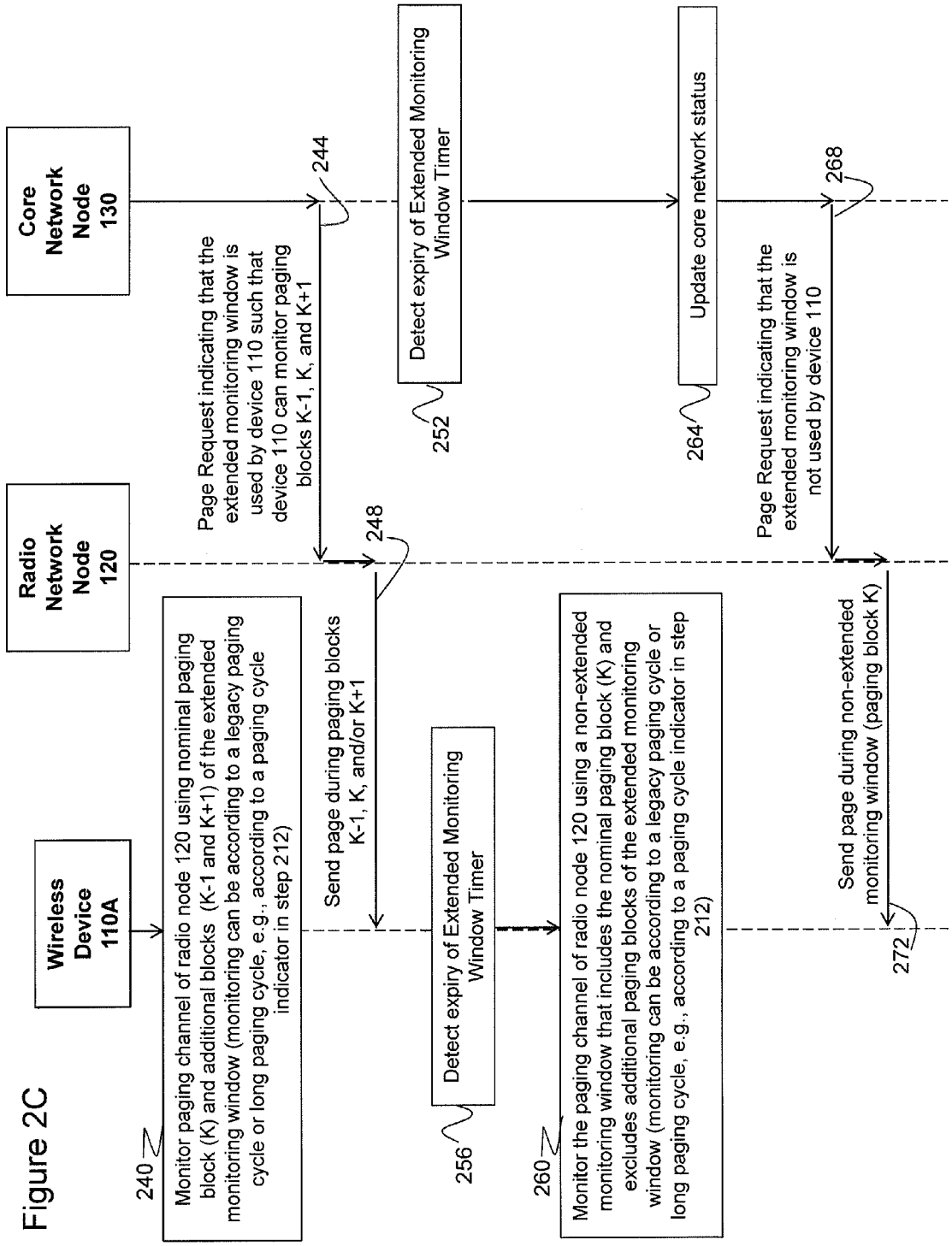

EXTENDED MONITORING WINDOW FOR ROBUST PAGING

RELATED APPLICATIONS

This application claims the benefit of priority of U.S. Provisional Patent Application No. 61/817,055 filed on Apr. 29, 2013.

TECHNICAL FIELD

The invention relates, in general, to wireless communications and, more particularly, to an extended monitoring window for robust paging.

BACKGROUND

In a wireless network, a wireless communication device (e.g., a Mobile Station (MS) or User Equipment (UE)) communicates with one or more radio access nodes to send and/or receive information, such as voice traffic, data traffic, and control signals. In some cases, the radio access node initiates sending information to the wireless communication device via a page request. As an example, the radio access node sends a page request to a wireless communication device in an idle or dormant state to trigger a corresponding page response from the wireless communication device and thereby acquire knowledge of its precise location as required to initiate setting up a traffic channel for sending information to the wireless communication device.

The radio access node sends the page request over a paging channel. The wireless communication device monitors the paging channel periodically based on its paging cycle. If the wireless communication device uses a legacy paging cycle, the wireless communication device wakes up approximately every few seconds to monitor its nominal paging block. If the wireless communication device uses a long paging cycle, the wireless communication device wakes up less often (e.g., on the order of days or weeks) to monitor its nominal paging block. While using the long paging cycle conserves power, undesirable delays can occur if the wireless communication device misses a page request and has to wait until the next paging cycle (e.g., days or weeks) to receive the missed page request.

As an example of a legacy paging cycle, a GSM case is considered wherein a number of parameters allow for determining how frequently a wireless communication device wakes up to read paging messages (i.e., the paging cycle) and which radio block in particular a wireless communication device will read within the context of a given paging cycle (i.e., the wireless communication device's paging group). For example, consider the case where the Total Number of radio blocks per 51-multiframe=10, where a Broadcast Control Channel (BCCH) uses 1 radio block per 51-multiframe. Assuming BCCH-Extended is not used, this leaves 9 radio blocks per 51-multiframe for the Paging Channel (PCH)+the Access Grant Channel (AGCH). Base Station Access Grant Blocks Reserved (BS_AG_BLKS_RES) determines how many radio blocks are reserved for AGCH (range from 0 to 7). This means the number of paging blocks per 51-multiframe=9−BS_AG_BLKS_RES (range from 9 to 2). Base Station Paging Periodicity in Multiframes (BS_PA_MFRMS) indicates the periodicity for transmission of PAGING REQUEST messages to the same paging subgroup and it ranges from 2 to 9. The "available" paging blocks per Common Control Channel (CCCH) are then those "available" per 51-multiframe on that CCCH multiplied by BS_PA_MFRMS (range from 2 to 9)=N. The number of different paging sub-channels on the CCCH=(9−BS-AG-BLKSRES)*BS-PA-MFRMS (i.e., N ranges from 4 to 81). Base Station Common Control Channels (BS_CC_CHANS) is the number of common control channels in a cell (range 1 to 4). Common Control Channel Group (CCCH_GROUP) (0 . . . BS_CC_CHANS-1)=((IMSI mod 1000) mod (BS_CC_CHANS×N)) div N=Paging Channel. PAGING_GROUP (0 . . . N−1)=((IMSI mod 1000) mod (BS_CC_CHANS×N)) mod N=Paging Group. Paging group is simply the paging block a wireless communication device reads on its assigned CCCH once every BS_PA_MFRMS 51-multiframes. Wireless communication devices are therefore required to monitor every Nth block of their paging channel, where N equals the number of available blocks in total on the paging channel of the specific CCCH which their CCCH_GROUP is required to monitor. Which of these N blocks a wireless communication device monitors is determined by the PAGING_GROUP calculation above, and all the wireless communication devices listening to a particular paging block in the set of N blocks in total are defined as being in the same PAGING_GROUP. A wireless communication device that follows this procedure can be said to use the legacy paging procedure. A wireless communication device that uses a monitoring interval that is longer than stated by the parameter BS-PA-MFRMS can be said to use a long paging cycle.

One major factor that can limit the stand-by time of a wireless communication device is the device's paging cycle. The paging cycle refers to the frequency that the device needs to wake up and monitor a paging channel for page requests. Existing specifications assume that paging is time critical. As a result, a core network node operating in accordance with existing specifications will initiate paging as soon as possible after receiving an incoming user plane payload so that the payload can be delivered to the corresponding device as soon as possible. This approach requires a wireless communication device to spend a significant amount of energy monitoring the paging channel in case a page request is intended for that device. Often times, however, the page requests being monitored turn out to be intended for different devices. In addition, frequent monitoring of the paging channel might not be necessary for less time critical applications, such as certain machine type communication (MTC) applications. To conserve energy, devices running less time critical applications can use a long paging cycle. When using a long paging cycle, a device wakes up to monitor the paging channel less frequently than when a legacy paging cycle is used.

If a device uses a longer paging cycle (i.e., reduces the frequency of monitoring paging blocks), the penalty for missing one paging block (e.g., decoding failure) is high. During such an event, the device relies on paging retransmissions initiated by the core network or the radio access network, including the option of blind retransmissions (i.e., not knowing if the device has responded). As the frequency of paging block monitoring decreases, the importance of the device successfully receiving its page requests during the monitored paging block tends to increase. Otherwise, a missed page will mean the device will not be able to receive a page until the next instance of its paging group. This can become problematic for an application that triggers the paging activity because the nominal paging notification delay will at least double. For example, the use of longer paging cycles creates an expectation of a worst case delay of the user plane payload for the affected devices (e.g., service plans and corresponding charging rates may be based on these worst case delays being satisfied). As such, allowing this worst case delay (e.g., 1 day)

to double (to 2 days for this example) due to a missed page may become unacceptable even for a device that supports less time critical applications.

SUMMARY

To address the foregoing problems in the prior art, disclosed is a wireless communication device that communicates an extended monitoring window indicator to a core network node. The extended monitoring window indicator indicates that the wireless communication device is capable of monitoring a paging channel of a radio access node using an extended monitoring window that includes one or more paging blocks in addition to a nominal paging block associated with the wireless communication device. The extended monitoring window indicator identifies the additional paging blocks of the extended monitoring window.

According to some embodiments, the wireless communication device communicates an extended monitoring window timer to a core network node. The extended monitoring window timer specifies a time period during which the wireless communication device uses the extended monitoring window. In response to a determination that the core network node can support the extended monitoring window, the wireless communication device starts the extended monitoring window timer. Prior to an expiry of the extended monitoring window timer, the wireless communication device monitors the paging channel during the nominal paging block and the additional paging blocks of the extended monitoring window. After the expiry of the extended monitoring window timer, the wireless communication device monitors the paging channel using a conventional non-extended monitoring window. The conventional non-extended monitoring window includes only the nominal paging block.

Also disclosed is a core network node operable to receive the extended monitoring window indicator from a wireless communication device. The core network node updates a core network status associated with the wireless communication device so that the status indicates that the wireless communication device is capable of using the extended monitoring window. The core network node sends a response message to the wireless communication device; the response message indicates that the core network node supports the extended monitoring window.

According to some embodiments, the core network node also receives the extended monitoring window timer from the wireless communication device. Upon receipt, the core network node starts an extended monitoring window timer. The core network node sends page requests to the radio access node for delivery to the wireless communication device. Prior to an expiry of the extended monitoring window timer in the core network node, the page requests indicate that the extended monitoring window is used by the wireless communication device and the additional paging blocks of the extended monitoring window. After the expiry of the extended monitoring window timer, the core network node updates the core network status associated with the wireless communication device to indicate that the wireless communication device is not using the extended monitoring window and sends page requests to the radio access node for delivery to the wireless communication device using a conventional non-extended monitoring window. The conventional non-extended monitoring window includes only the nominal paging block.

BRIEF DESCRIPTION OF THE DRAWINGS

For a more complete understanding of the present invention and its features and advantages, reference is now made to the following description, taken in conjunction with the accompanying drawings, in which:

FIGS. 2A-2C illustrate a signaling diagram for signals between network nodes and devices, and functions embodied therein, in accordance with the principles of the invention;

DETAILED DESCRIPTION

The principles of the invention disclosed herein provide solutions to the foregoing problems. To ensure successful reception/decoding of a paging message intended for a device (and thereby avoid increasing the worst case delay of user plane payload), a wireless communication device monitors the paging channel for a number of paging blocks in addition to the paging block strictly associated with its nominal paging group. Retransmissions of the device's paging messages can be sent during the additional paging blocks; the additional paging blocks normally serve as nominal paging blocks associated with other wireless communication devices. As an example, a device using an extended monitoring window monitors the device's nominal paging block and additional paging blocks occurring before, following, or both before and following its nominal paging block. The additional paging blocks can be adjacent to the nominal paging block, or there can be one or more unmonitored blocks between the additional paging blocks and the nominal paging block. The number and/or configuration of additional paging blocks monitored during the extended monitoring window can be communicated using a new parameter passed to or from the device during non-access stratum (NAS) signaling (e.g., ATTACH), or can be provided as new system information. The monitoring window can also be predetermined as a consequence of using a long paging cycle.

Particular embodiments of the invention relate to devices using a legacy paging cycle and/or to devices using a long paging cycle. A legacy device monitors the nominal paging block according to a legacy non-DRX mode. In a legacy non-DRX mode, a device uses a relatively short time period of discontinuous reception (DRX) such that the device wakes up relatively frequently to monitor nominal paging blocks (e.g., every few seconds). When using a long paging cycle, the nominal paging block is monitored according to an extended non-DRX mode. In an extended non-DRX mode, a device uses a relatively long time period of discontinuous reception (DRX) such that the device wakes up relatively infrequently to monitor nominal paging blocks (e.g., on the order of days or weeks).

Figure 1:
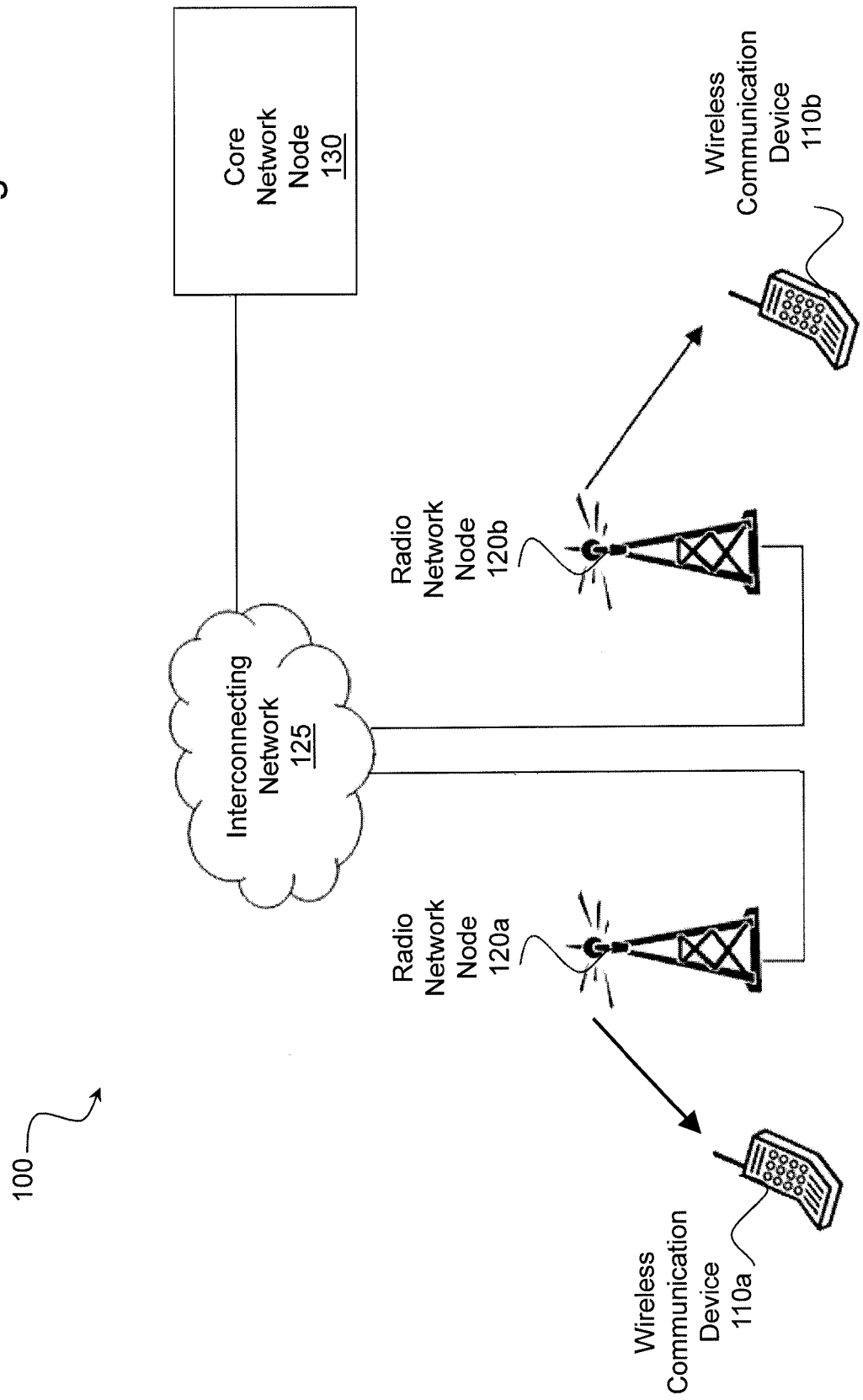
FIG. 1 is a block diagram of an exemplary wireless network.

FIG. 1 is a block diagram of an exemplary wireless network 100 for communicating with wireless communication devices 110. The nodes of network 100 include radio network nodes 120 and core network nodes 130. As illustrated, wireless communication device 110a communicates with radio network node 120a over a wireless interface. For example, wireless communication device 110a transmits wireless signals to radio network node 120a and/or receives wireless signals from radio network node 120a. The wireless signals can include voice traffic, data traffic, and control signals.

A radio network node 120 refers to any suitable node of a radio access network/base station system; examples include a radio access node (such as a base station or eNodeB) and a radio access controller (such as a base station controller or other node in the radio network that manages radio access nodes). Radio network node 120 interfaces (directly or indirectly) with core network node 130 via an interconnecting network 125.

Core network node 130 manages the establishment of communication sessions and various other functionality for wireless communication device 110. Wireless communication device 110 exchanges certain signals with core network node 130 using a non-access stratum layer. In non-access stratum (NAS) signaling, signals between wireless communication device 110 and core network node 130 pass transparently through radio network nodes 120. Exemplary embodiments of wireless communication device 110, radio network node 120, and core network node 130 are illustrated in and described hereinafter with respect to FIGS. 4, 5, and 6, respectively.

In accordance with the principles of the invention, network 100 facilitates using an extended monitoring window wherein wireless communication device 110 monitors a paging channel of radio network node 120 during a nominal paging block plus a number of additional paging blocks. In some embodiments, wireless communication device 110 can use NAS signaling to inform core network node 130 (such as a serving GPRS support node (SGSN)) that wireless communication device 110 is capable of monitoring for a paging signal during the extended monitoring window.

Core network node 130 uses the extended monitoring window information when sending page requests to the radio access node 120 for delivery to the wireless communication device 110. For example, core network node 130 can convey the extended monitoring window information to a base station subsystem (BSS) when sending page requests addressed to wireless communication device 110. The BSS can then take the extended monitoring window capability of wireless communication device 110 into account when sending page requests to device 110 over the radio interface.

In some embodiments, wireless communication device 110 can use the extended monitoring window for a limited time period. As an example, the time period may start when wireless communication device 110 sends a NAS message indicating a corresponding timer value to core network node 130 and receives a corresponding NAS message in response. Wireless communication device 110 and/or core network node 130 will then start their respective timers. Wireless communication device 110 stops using the extended monitoring window in response to expiry of its timer, and core network node 130 stops conveying the extended monitoring window information to the BSS in response to expiry of its timer. Thus, in some embodiments, core network node 130 keeps track of the timer such that the BSS need not be explicitly informed of the timer value.

Figure 2A:
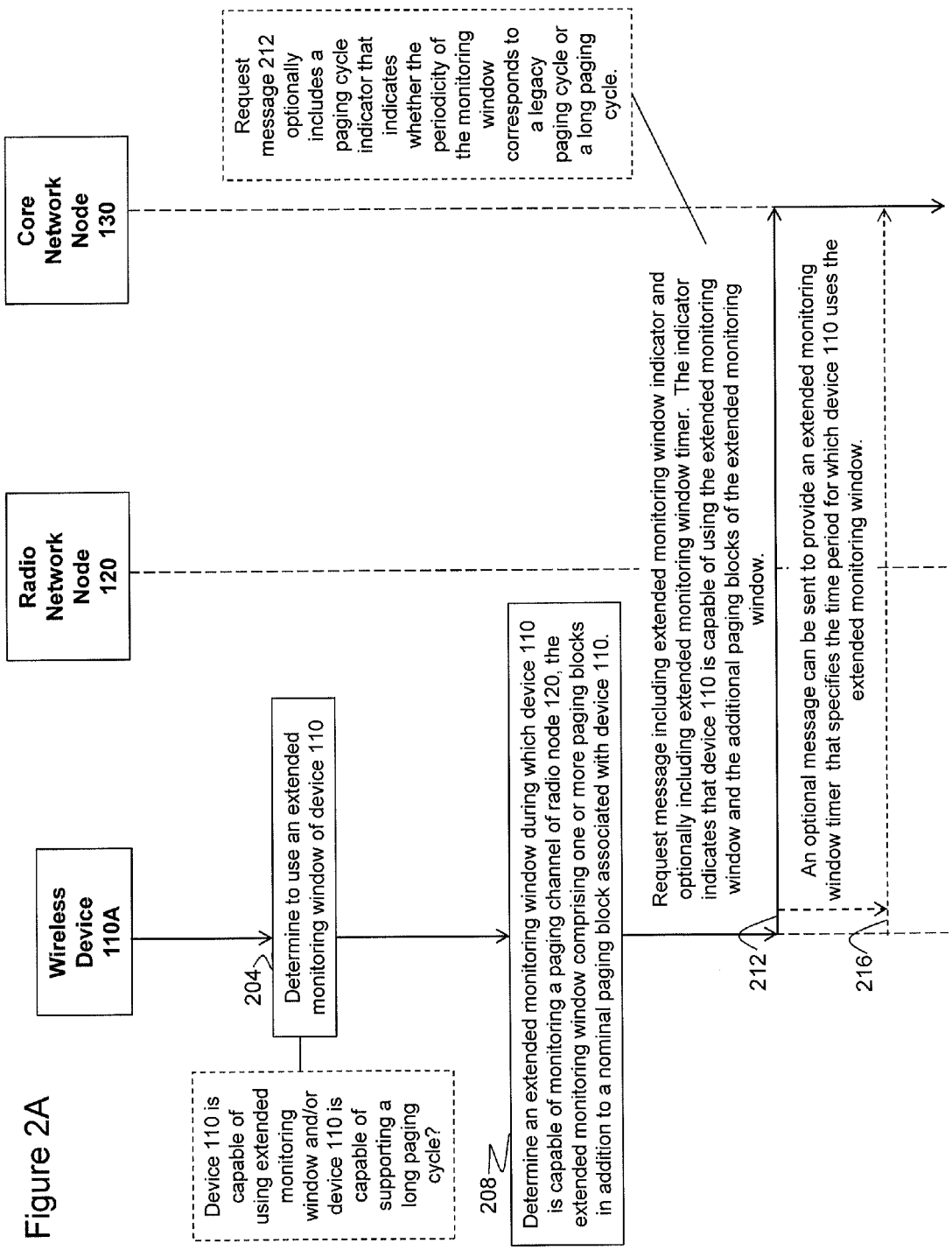

FIGS. 2A-2C illustrate a signaling diagram for signals between network nodes and devices, and functions embodied therein, in accordance with the principles of the invention. In some embodiments, the signals are exchanged among a wireless communication device 110 (such as a User Equipment, or UE), a radio network node 120 (such as a radio base station or controller), and a core network node 130 (such as an SGSN).

In FIG. 2A, wireless communication device 110 determines to use an extended monitoring window (step 204 if it supports extended monitoring capability. In some embodiments, extended monitoring capability is a default capability of wireless communication device 110; alternatively, extended monitoring window capability can be a configured capability. As an example, wireless communication device 110 can determine whether to configure/enable an extended monitoring window based on an indication of whether or not the serving radio access network supports the transmission of page requests using paging blocks preceding and/or following a nominal paging block. In alternative embodiments, system information from the radio access network is enhanced to include such an indication. As another example, wireless communication device 110 can determine whether to configure/enable an extended monitoring window as part of a registration procedure. In other embodiments, wireless communication device 110 can determine to configure/enable an extended monitoring window if device 110 is using a long paging cycle. A long paging cycle uses a periodicity of nominal paging blocks that exceeds that of a legacy paging cycle. In some embodiments, the legacy paging cycle corresponds to a paging cycle supported by specification 3GPP TS 44.018 version 12.1.0, which specifies a legacy periodicity of nominal paging blocks; the legacy paging cycle is described in more detail hereinafter with respect to FIG. 3. Step 204 is optional and can be skipped, for example, if wireless communication device 204 automatically uses an extended monitoring window.

At step 208, wireless communication device 110 determines the extended monitoring window during which device 110 is capable of monitoring a paging channel of radio network node 120. The extended monitoring window comprises one or more paging blocks in addition to a nominal paging block associated with device 110; the nominal paging block refers to the paging block that wireless communication device 110 is assigned to monitor. The nominal paging block can be the paging group determined according to a legacy specification, such as 3GPP TS 44.018 version 12.1.0, wherein periodicity of the nominal paging block can be in the range of seconds. In alternative embodiments, device 110's paging group can be determined using extensions to the legacy specification wherein periodicity of the nominal paging block can be in the range of days or weeks (see, e.g., U.S. Patent Publication No. 20110195709, entitled "Method and Arrangement in a Telecommunication System" by Christensson, et al.).

The extended monitoring window can include a number of consecutive paging blocks adjacent to a nominal paging block associated with wireless communication device 110. The adjacent paging blocks refer to additional paging blocks to be monitored by device 110 (in addition to the nominal paging block). Any suitable number of adjacent paging blocks may be used (e.g., 1, 2, 3, ... n paging blocks). The adjacent paging blocks can occur immediately before, immediately after, or a combination of immediately before and immediately after the nominal paging block such that all paging blocks monitored are contiguous, wherein the nominal paging block can occur anywhere in the set of contiguous paging blocks. As one example, where the monitoring window includes the nominal paging block (K), the extended monitoring window can include one paging block immediately before the nominal paging block (K−1) and one paging block immediately after the nominal paging block (K+1). As another example, the monitoring window can include the nominal paging block (K) and the extended monitoring window includes two paging blocks immediately before the nominal paging block (e.g., K−2 and K−1).

In other embodiments, the extended monitoring window can include one or more non-adjacent paging blocks such that one or more unmonitored paging blocks occur between the nominal paging block and the additional block(s) of the extended monitoring window. As one example, the monitoring window includes a nominal paging block (K) and the extended monitoring window includes a non-adjacent paging block before the nominal paging block (e.g., K−2) and a non-adjacent paging block after the nominal paging block (e.g., K+2) (but need not include adjacent paging blocks K−1 and K+1).

The number and/or sequence of additional paging blocks can be pre-configured or determined dynamically. In some embodiments, wireless communication device 110 selects the number of additional paging blocks relative to the length of the paging cycle. As an example, if the paging cycle has a periodicity of once per day, then wireless communication device 110 could monitor one additional paging block. If the periodicity of the paging cycle increases to once per week, then wireless communication device 110 could increase the number of additional paging blocks to monitor to two (or more) paging blocks.

At step 212, wireless communication device 110 communicates an extended monitoring window indicator to core network node 130. The extended monitoring window indicator can be communicated using NAS signaling. In some embodiments, wireless communication device 110 communicates the indicator during registration procedures; examples of registration procedures include, but are not limited to, ATTACH, ROUTING AREA UPDATE, LOCATION AREA UPDATE, and TRACKING AREA UPDATE. The extended monitoring window indicator informs core network node 130 that wireless communication device 110 is capable of using an extended monitoring window.

The extended monitoring window indicator indicates the additional paging blocks of the extended monitoring window. As an example, the extended monitoring window indicator indicates the number of additional paging blocks of the extended monitoring window. In some embodiments, the indicator also indicates the position of the additional paging blocks. The position could be before the nominal paging block, after the nominal paging block, or both. The position could be consecutive or non-consecutive with respect to the nominal paging block or with respect to other additional paging blocks of the extended monitoring window. Continuing with the first example described with respect to step 208, the indicator would inform core network node 130 that wireless communication device 110 is capable of monitoring paging blocks K−1, K, and K+1.

In some embodiments, wireless communication device 110 optionally communicates an extended monitoring window timer to core network node 130. The extended monitoring window timer is associated with the extended monitoring window indicator and specifies the time period for which wireless communication device 110 will use the extended monitoring window. After the timer expires, wireless communication device 110 stops using the extended monitoring window and begins using a conventional, non-extended monitoring window; i.e., the non-extended monitoring window only includes the nominal paging block K (and excludes the additional paging blocks, such as K−1 and K+1).

The extended monitoring window timer can be used by devices 110 using legacy non-DRX mode (e.g., legacy paging cycles) or devices using extended non-DRX mode (e.g., long paging cycles). The extended monitoring window timer duration can be a function of the frequency/periodicity of the monitoring window. For example, the duration can be set such that wireless communication device 110 monitors 1, 2, or n paging cycles using the extended monitoring window. Thus, in some embodiments, the duration is longer for devices 110 using longer paging cycles.

The extended monitoring window timer can be communicated during NAS signaling or during registration procedures. The extended monitoring window indicator and the extended monitoring window timer can be communicated in the same message (e.g., both can be communicated in step 212), or the extended monitoring window timer can be communicated in a separate message (as illustrated in step 216 of FIG. 2A). Alternatively, the extended monitoring window timer can be pre-configured and, thus, need not be negotiated/exchanged in a message. In some embodiments, the length of the timer can be configured by O&M in the core network and known by wireless communication device 130 through the means of System Information (which may require configuration through O&M in the radio access network) or through a device management protocol such as that specified by the Open Mobile Alliance (OMA) Device Management (DM) Working Group. Even with this approach, wireless communication device 110 can still use registration procedures (or other suitable procedures) to notify the core network about when it will start using an extended monitoring window.

Although the preceding example describes using a timer to coordinate when to stop using the extended monitoring window, other techniques could be used. As an example, if and when wireless communication device 110 determines to fall back to the non-extended monitoring window (i.e., stop using the extended monitoring window), device 110 can send a second indicator to core network node 130 to use the non-extended monitoring window rather than the extended monitoring window. The second indicator also may be sent using NAS signaling and/or during a registration procedure. Wireless communication device 110 determines whether or not to use the extended monitoring window based on any suitable criteria, such as whether device 110 is currently capable of supporting and/or configured with a long paging cycle or whether the current battery life or other resources available at device 110 support using an extended monitoring window.

Similarly, core network node 130 can send an indicator to device 110 to fall back to legacy paging (i.e., to not use the extended monitoring window). As an example, if core network node 130 determines that the base station subsystem is lightly loaded (i.e., not congested), core network node 130 can infer that there is a high enough probability of successful paging during the nominal paging block that an extended monitoring window need not be used.

Continuing to FIG. 2B, at step 220, core network node 130 updates a core network status of the wireless communication device to indicate that the wireless communication device is capable of using the extended monitoring window and the additional blocks of the extended monitoring window (such as the number and/or position of additional paging blocks of the extended monitoring window). As an example, core network node 130 updates a profile associated with wireless communication device 110 and stored in, for example, an SGSN database, a home location register (HLR), or a visitor location register (VLR).

At step 224, core network node 130 sends wireless communication device 110 a response message that responds to the request message of step 212. For example, if the request message of step 212 was a registration message (e.g., ATTACH, ROUTING AREA UPDATE, LOCATION AREA UPDATE, TRACKING AREA UPDATE), the response message at step 224 would be the corresponding registration response. If core network node 130 supports the extended monitoring window, the response message includes bonus information in addition to the portion of the message that responds to the registration request; the bonus information indicates support for the extended monitoring window.

At step 228, wireless communication device 110 determines whether the response message received at step 224 indicates that core network node 130 supports the extended monitoring window. For example, if the response message does not include the bonus information, wireless communication device 110 determines that core network node 130 does not support the extended monitoring window and the method skips to step 260 (described hereinafter). If the response message does include the bonus information, wireless communication device 110 determines that core network node 130 supports the extended monitoring window and proceeds to step 232 to start the extended monitoring window timer (if an extended monitoring window timer is used). In response to sending the response message at step 224, core network node 130 starts the extended monitoring window timer at step 236 (if an extended monitoring window is used).

Continuing to FIG. 2C, as shown at step 240, prior to an expiry of the extended monitoring window timer, wireless communication device 110 monitors the paging channel of radio network node 120 using the extended monitoring window. Continuing with the earlier example, wireless communication device 110 monitors paging blocks K−1, K, and K+1 (at a periodicity determined by device 110's paging cycle) prior to the expiry of the extended monitoring window timer.

Prior to the expiry of the extended monitoring window timer, core network node 130 sends page requests to the radio network node 120 that indicate that the extended monitoring window is used by wireless communication device 110. As shown in step 244, the page requests from core network node 130 inform radio network node 120 which blocks are included in the monitoring window (e.g., K−1, K, K+1). At step 248, radio network node 120 sends page requests to wireless communication device 110 during paging blocks K−1, K, and/or K+1. Because the radio network node 120 may receive the page request message from core network node 130 shortly before device 110's nominal paging block, the base station system might send out some pages using the extended monitoring window's paging block(s) that precede device 110's nominal paging block (e.g., K−1). The base station system could also send some page requests using device 110's nominal paging block (K) and/or the extended monitoring window's paging block(s) that follow device 110's nominal paging block (e.g., K+1).

At step 252, core network node 130 detects expiry of its extended monitoring window timer; and, at step 256, wireless communication device 110 detects expiry of its extended monitoring window timer. In response to detecting the expiry of its extended monitoring window timer, wireless communication device 110 then monitors the paging channel using its non-extended monitoring window (step 260). The non-extended monitoring window only includes device 110's nominal paging block (K).

In some embodiments, wireless communication device 110 retains the same paging cycle after transitioning from using an extended monitoring window to a non-extended monitoring window. In such embodiments, if wireless communication device 110 monitored the extended monitoring window according to a legacy paging cycle, wireless communication device 110 would also monitor the non-extended monitoring window according to the legacy paging cycle. Similarly, if wireless communication device 110 monitored the extended monitoring window according to a long paging cycle, wireless communication device 110 would also monitor the non-extended monitoring window according to the long paging cycle.

In alternative embodiments, wireless communication device 110 can use a different paging cycle after transition from an extended monitoring window to a non-extended monitoring window. As an example, a wireless communication device 110 monitoring an extended monitoring window according to a long paging cycle could switch to monitoring a non-extended monitoring window according to a legacy paging cycle. Thus, when the amount of time between cycles is longer, more blocks would be monitored per cycle and when the amount of time between cycles is shorter, fewer blocks would be monitored per cycle. Alternatively, a wireless communication device 110 monitoring an extended monitoring window according to a legacy paging cycle could switch to monitoring a non-extended monitoring window according to a long paging cycle.

In some embodiments, wireless communication device 110 sends a paging cycle indicator to core network node 130 indicating whether a legacy paging cycle or a long paging cycle is used. The indicator can be a binary value (e.g., 0 for legacy paging cycle, 1 for long paging cycle, or vice versa) or a periodicity value (e.g., an amount of time between paging cycles). In such embodiments, wireless communication device 110 can send the paging cycle indicator with the extended monitoring window indicator in step 212 to indicate the periodicity with which wireless communication device 110 will monitor the nominal paging block and the additional blocks of the extended monitoring window. Wireless communication device 110 can also send the periodicity indicator (or a second periodicity indicator) with the extended monitoring window timer in step 212 (or step 216) to indicate the periodicity with which wireless communication device 110 will monitor the nominal paging block of the non-extended monitoring window (e.g., upon expiry of the extended monitoring window timer). Wireless communication device 110 may also send the periodicity indicator separately from the extended monitoring window indicator; for example, if wireless communication device 110 determines to continue to monitor the same number of paging blocks (e.g., K−1, K, K+1), but wants to change the monitoring periodicity from the long paging cycle to the legacy paging cycle (or vice versa). Finally, wireless communication device 110 need not send a paging cycle indicator, for example, if wireless communication device 110 determines to use the same paging cycle regardless of whether device 110 is using the extended monitoring window or the non-extended monitoring window.

At step 264, in response to detecting the expiry of the extended monitoring window timer, core network node 130 updates the core network status of wireless communication device 110 to indicate that wireless communication device 110 is not capable of using the extended monitoring window. Core network node 130 updates the core network status in a manner similar to that described above with respect to step 220. Subsequent page requests that core network node 130 sends radio network node 120 (step 268) indicate that the extended monitoring window is not used by wireless communication device 110. The indication can be explicit (e.g., instruct radio network node 120 to use legacy paging/nominal paging block K) or implicit (e.g., the absence of an extended monitoring window in the paging request implies that legacy paging/nominal paging block K should be used). At step 272, radio network node 120 pages wireless communication device 110 during the nominal paging block of the non-extended monitoring window (paging block K) according to the paging cycle (long paging cycle or legacy paging cycle) being used by wireless communication device 110.

In general, a wireless communication device sends an extended monitoring window indicator to a core network node (such as an SGSN) if the device uses an extended monitoring window. The core network node updates a status associated with the wireless communication device and, after that, the core network node can send a page to a radio network node (such as a BSS) indicating that the wireless communication device supports early or late paging relative to the device's nominal paging block. Using the extended monitoring window can increase the probability of successfully paging the wireless communication device. The extended monitoring window can be especially useful for machine type devices with long sleep times (e.g., 1 week, day, month) to make sure a page request gets through at the earliest opportunity.

The extended monitoring window indicator can be associated with an extended monitoring window timer. For example, the wireless communication device can send the extended monitoring window timer to a core network node to indicate that the wireless communication device only supports extended window monitoring for a certain period of time. As an example, the timer can indicate that the wireless communication device will use an extended monitoring window for two hours and, after that, the device will use a non-extended monitoring window.

Figure 3:
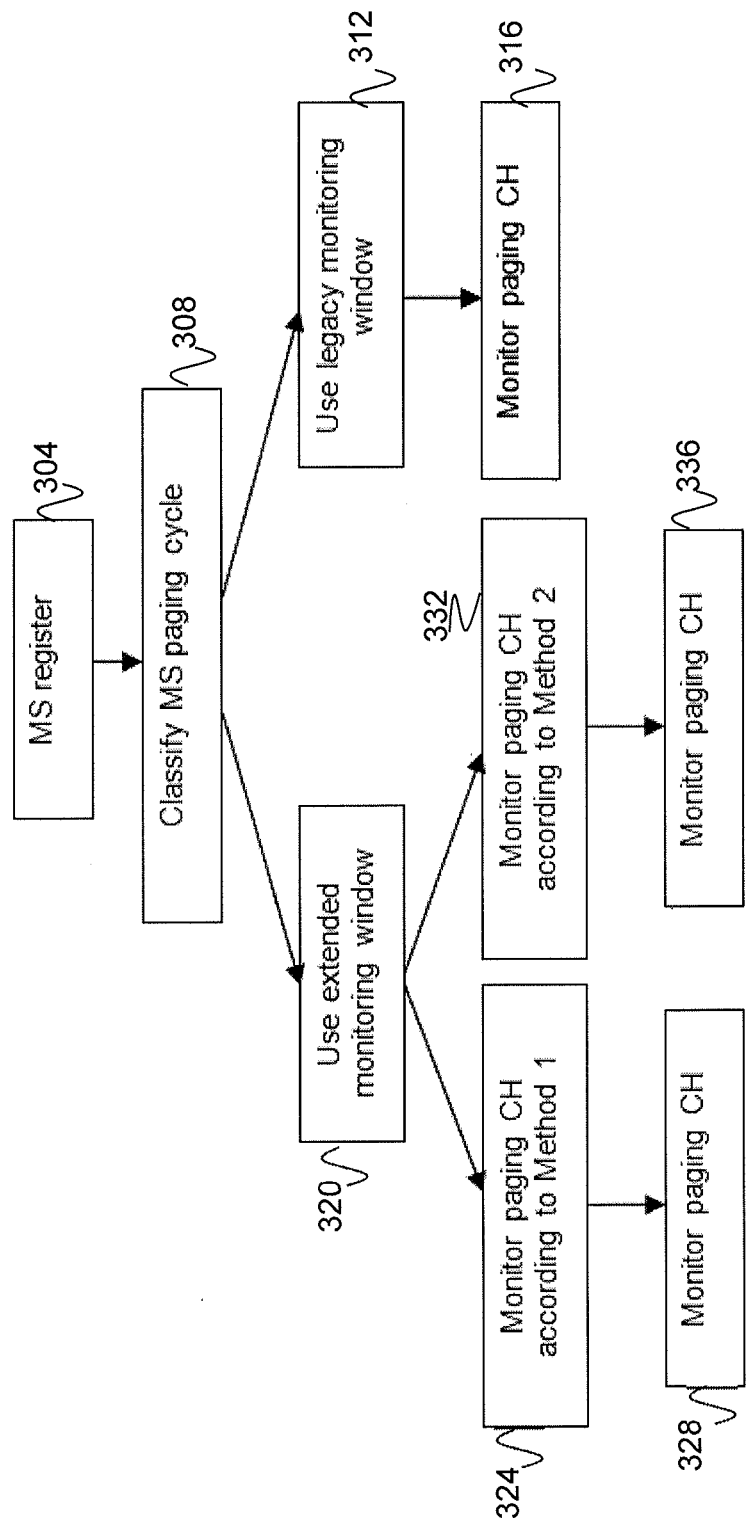
FIG. 3 is a flow chart illustrating a method for monitoring a paging channel in accordance with the principles of the invention.

FIG. 3 is a flow chart illustrating a method for monitoring a paging channel in accordance with the principles of the invention. At step 304, wireless communication device 110 registers with core network node 130. The registration indicates that wireless communication device 110 is powered on and is located within the network. If wireless communication device 110 supports an extended monitoring window, the registration includes an extended monitoring window indicator.

At step 308, core network node 130 classifies wireless communication device 110 based on whether wireless communication device 110 is capable of reading an extended monitoring window (e.g., can device 110 read early and/or late page requests before/after its nominal paging block). At step 304, if wireless communication device 110 has not sent an extended monitoring window indicator indicating use of an extended monitoring window, core network node 130 proceeds to use a non-extended monitoring window (step 312) that only includes device 110's nominal paging block. At step 316, wireless communication device 110 monitors the paging channel using the non-extended monitoring window.

If at step 304 wireless communication device 110 sent an extended monitoring window indicator indicating use of an extended monitoring window, core network node 130 classifies device 110 as using the extended monitoring window at step 320. If wireless communication device uses a legacy paging cycle (e.g., legacy DRX period), core network node 130 proceeds to step 324 (method 1) to update the core network status to reflect device 110's paging configuration (e.g., legacy DRX mode with extended monitoring window). If wireless communication device 110 uses a long paging cycle (e.g., extended DRX period), core network node 130 proceeds to step 332 (method 2) to update the core network status to reflect device 110's paging configuration (e.g., extended DRX mode with extended window monitoring).

Method 1 and method 2 may generally be the same except for the frequency at which wireless communication device 110 wakes up to monitor its nominal paging block. In some embodiments, the configuration of the extended monitoring window (e.g., number of blocks preceding and/or following the nominal paging block) and/or an extended monitoring window timer can be pre-configured. The pre-configured value can be different depending on whether method 1 (legacy non-DRX) or method 2 (extended-DRX) is used. As an example, the number of additional paging blocks in the extended monitoring window and the length of time for the extended monitoring window timer could be increased in method 2. Once core network node 130 and wireless communication device 110 both know that device 110 is using the extended monitoring window, device 110 monitors the extended monitoring window according to a legacy DRX period (e.g., in method 1, step 328) or an extended DRX period (e.g., in method 2, step 336).

As described supra with respect to FIG. 1e, embodiments of network 100 can include one or more wireless communication devices 110, and one or more different types of network nodes capable of communicating (directly or indirectly) with wireless communication devices 110. Examples of the network nodes include radio network nodes 120 and core network nodes 130.

The principles of the disclosed invention can be used with any suitable radio access technology, such as long term evolution (LTE), LTE-Advanced, UMTS, HSPA, GSM, cdma2000, WiMax, WiFi, or any suitable combination of one or more radio access technologies. Each of wireless communication device 110, radio network node 120, and core network node 130 include any suitable combination of hardware and/or software operable to perform the disclosed functions. Examples of particular embodiments of wireless communication device 110, radio network node 120, and core network node 130 are described with respect to FIGS. 4, 5, and 6, respectively.

Figure 4:
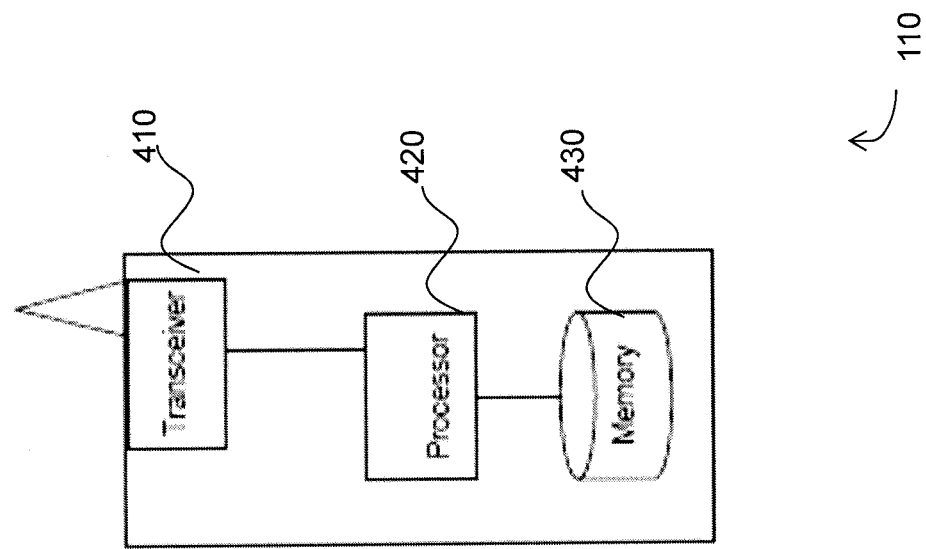
FIG. 4 is a block schematic of a wireless communication device suitably operative in accordance with the principles of the invention.

FIG. 4 is a block schematic of a wireless communication device 110 operative in accordance with the principles of the invention. Examples of wireless communication device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. Wireless communication device 110 includes transceiver 410, processor 420, and memory 430. In some embodiments, transceiver 410 facilitates transmitting wireless signals to and receiving wireless signals from radio network node 120 (e.g., via an antenna), processor 420 executes instructions to provide some or all of the functionality described herein as provided by a wireless communication device 110, and memory 430 stores the instructions executed by processor 420.

Processor 420 includes any suitable combination of hardware and software implemented in one or more integrated circuits or modules to execute instructions and manipulate data to perform some or all of the described functions of wireless communication device 110. Memory 430 is generally operable to store computer executable code and data. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless communication device 110 include additional components (beyond those shown in FIG. 4) responsible for providing certain aspects of the wireless communication device's functionality, including any of the functionality described above and/or any additional functionality (including any functionality necessary to support the solution described above).

Figure 5:
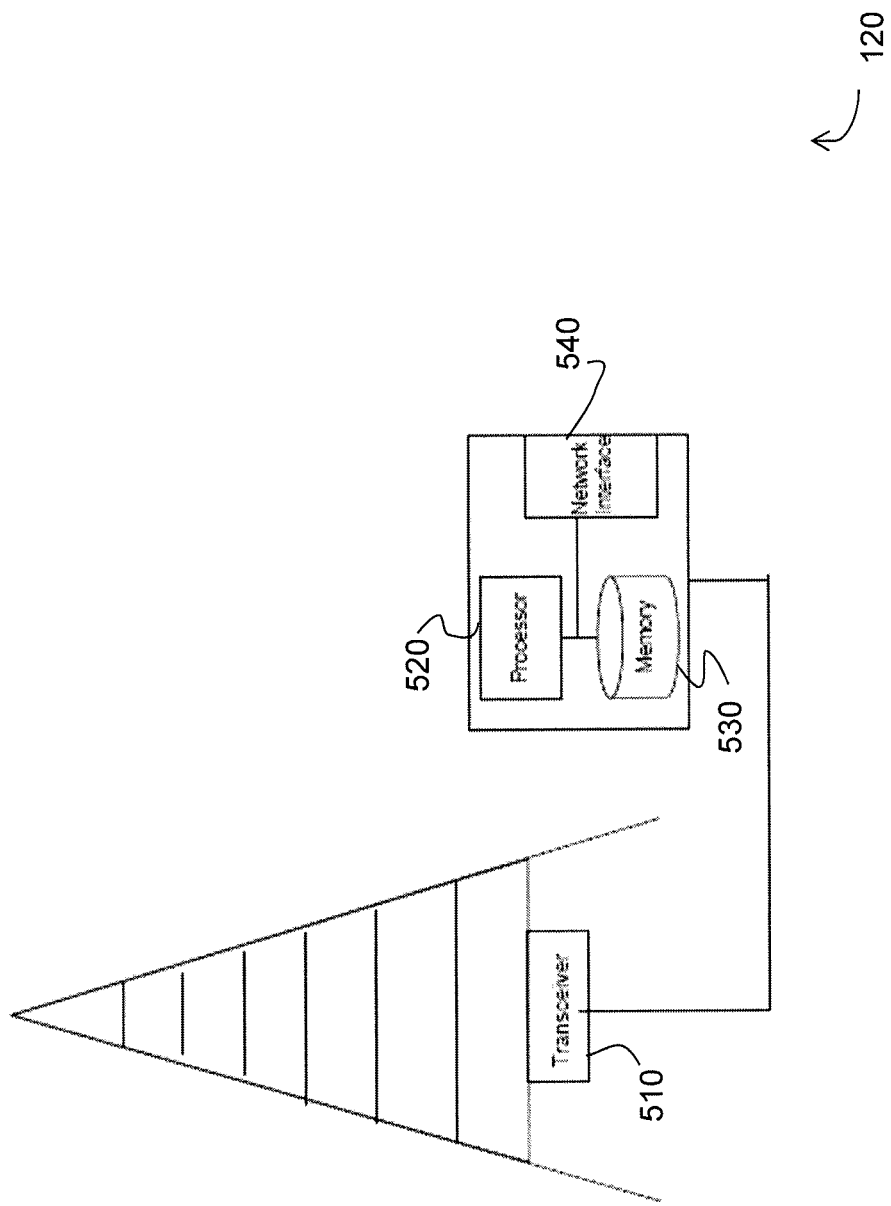
FIG. 5 is a block schematic of a radio access node suitably operative in accordance with the principles of the invention; and, FIG. 6 is a block schematic of a core network node suitably operative in accordance with the principles of the invention.

FIG. 5 is a block schematic of a radio network node 120 operative in accordance with the principles of the invention. Radio network node 120 can be, for example, a radio access node, such as an eNodeB, a node B, a base station, a wireless access point (e.g., a Wi-Fi access point), a low power node, a base transceiver station (BTS), a transmission point or node, a remote RF unit (RRU), or a remote radio head (RRH). Other radio network nodes 120, such as one or more radio network controllers, can be configured between the radio access nodes and core network nodes 130. Such other radio network nodes 120 can include processors, memory, and interfaces similar to those described with respect to FIG. 5; such other radio network nodes, however, might not necessarily include a wireless interface, such as transceiver 510.

Radio network node 120 includes at least one processor 520, at least one memory 530, and at least one network interface 540; in certain embodiments, radio network node 120 can also include a transceiver 510. Transceiver 510 facilitates transmitting wireless signals to and receiving wireless signals from wireless communication device 110 (e.g., via an antenna); processor 520 executes instructions to provide some or all of the functionality described above as being provided by a radio network node 120; memory 530 stores the instructions executed by processor 520; and network interface 540 communicates signals to backend network components, such as a gateway, switch, router, Internet, Public Switched Telephone Network (PSTN), other radio network nodes 120, and/or core network nodes 130. The processor 520 and memory 530 can be of the same types as described supra with respect to FIG. 4.

In some embodiments, network interface 540 is communicatively coupled to processor 520 and refers to any suitable device operable to receive input for radio network node 120, send output from radio network node 120, perform suitable processing of the input or output or both, communicate to other devices, or any combination of the preceding. Network interface 540 includes appropriate hardware (e.g., port, modem, network interface card, etc.) and software, including protocol conversion and data processing capabilities, to communicate through a network.

Other embodiments of radio network node 120 include additional components (beyond those shown in FIG. 5) responsible for providing certain aspects of the radio network node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Figure 6:
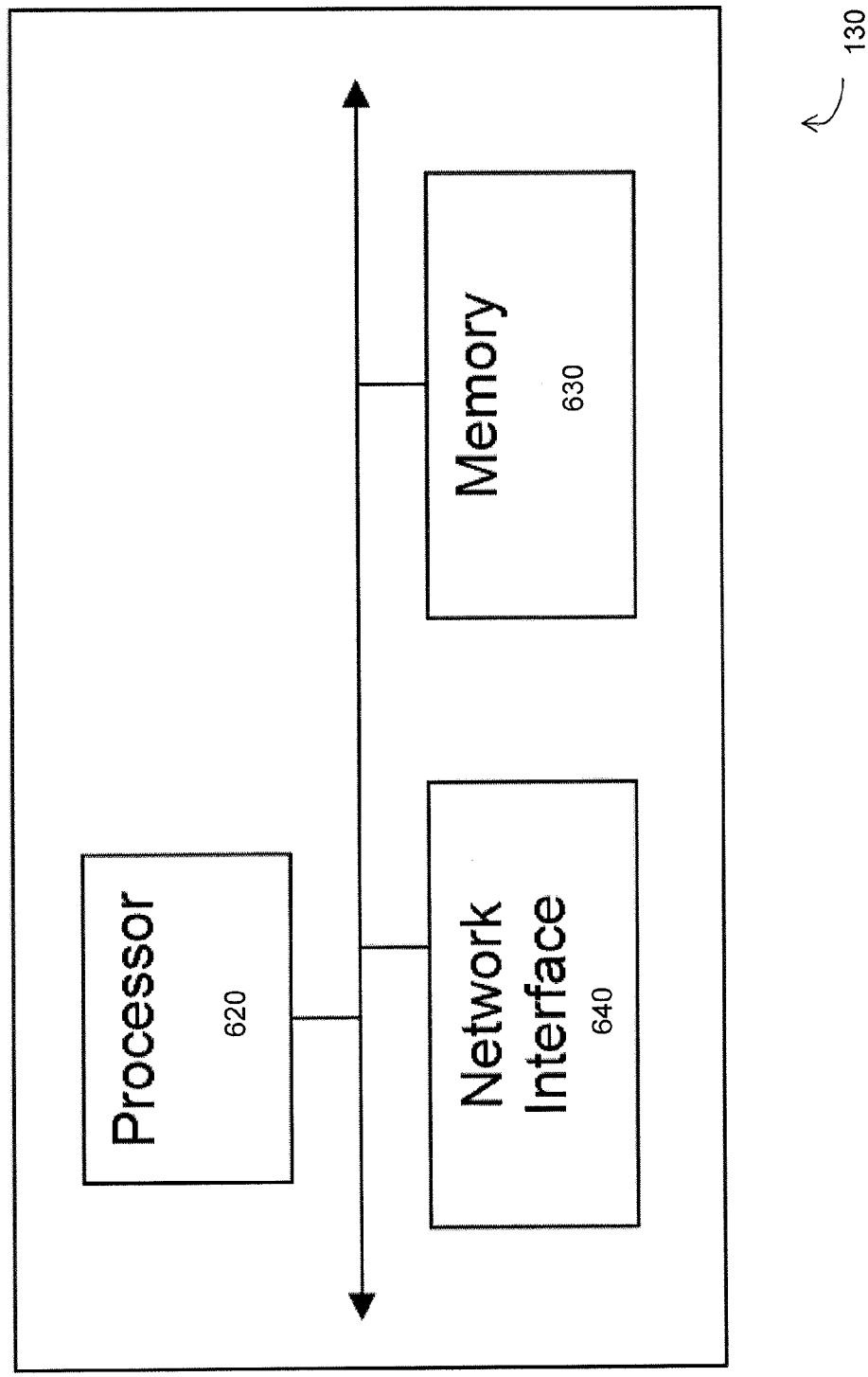

FIG. 6 is a block schematic of a core network node 130 operative in accordance with the principles of the invention. Examples of a core network node 130 include, but are not limited to, a mobile switching center (MSC), a serving GPRS support node (SGSN), a mobility management entity (MME), a radio network controller (RNC), a base station controller (BSC). Core network node 130 includes processor 620, memory 630, and network interface 640. Processor 620 executes instructions to provide some or all of the functionality described above as being provided by core network node 130; memory 630 stores the instructions executed by processor 620; and network interface 640 communicates signals to other network nodes. The processor 620 and memory 630 can be of the same types as described supra with respect to FIG. 4.

In some embodiments, network interface 640 is communicatively coupled to processor 620 and may refer to any suitable device operable to receive input for core network node 130, send output from core network node 130, perform suitable processing of the input or output or both, communicate to other devices, or any combination of the preceding. Network interface 640 includes appropriate hardware (e.g., port, modem, network interface card, etc.) and software, including protocol conversion and data processing capabilities, to communicate through a network. Other embodiments of core network node 130 include additional components (beyond those shown in FIG. 6) responsible for providing certain aspects of the core network node's functionality, including any of the functionality described above and/or any additional functionality (including any functionality necessary to support the solution described above).

Modifications, additions, or omissions may be made to the methods, systems and apparatuses disclosed herein without departing from the principles of the disclosed invention. The components of the systems and apparatuses may be discrete or integrated. Moreover, the operations of the systems and apparatuses may be performed by more, fewer, or other components. Additionally, operations of the systems and apparatuses may be performed using any suitable logic comprising software, hardware, or combinations thereof.

We claim:

1. A wireless communication device, comprising:
   one or more processors; and
   at least one memory, the memory containing instructions executable by the one or more processors whereby the wireless communication device is operable to:
      communicate a request message to a core network node, the request message including:
         an extended monitoring window indicator indicating that the wireless communication device is capable of using an extended monitoring window to monitor a paging channel of a radio access node, the extended monitoring window comprising one or more paging blocks in addition to a nominal paging block associated with the wireless communication device, the extended monitoring window indicator indicating the additional paging blocks of the extended monitoring window; and
         a paging cycle indicator indicating that the wireless communication device monitors the nominal paging block according to a long paging cycle, the long paging cycle having a longer periodicity than that supported by specification 3GPP TS 44.018 version 12.1.0;
      receive a response message from the core network node;
      monitor the paging channel using the extended monitoring window and the long paging cycle if the response message indicates that the core network node supports the extended monitoring window and the long paging cycle;
      monitor the paging channel using the non-extended monitoring window and the long paging cycle if the response message does not indicate that the core network node supports the extended monitoring window but indicates that the long paging cycle is supported; and,
      monitor the paging channel using a non-extended monitoring window and a legacy paging cycle if the response message does not indicate that the core network node supports the extended monitoring window and does not indicate that the long paging cycle is supported, the non-extended monitoring window including the nominal paging block and excluding the additional paging blocks, the legacy paging cycle having a periodicity supported by specification 3GPP TS 44.018 version 12.1.0.

2. The wireless communication device of claim 1, further operable to:
communicate an extended monitoring window timer to the core network node, the extended monitoring window timer associated with the extended monitoring window indicator and specifying a time period for which the wireless communication device uses the extended monitoring window;
start the extended monitoring window timer in response to a determination that the core network node supports the extended monitoring window;
prior to an expiry of the extended monitoring window timer, monitor the paging channel using the nominal paging block and the additional paging blocks of the extended monitoring window; and,
after the expiry of the extended monitoring window timer, monitor the paging channel using a non-extended monitoring window, the non-extended monitoring window including the nominal paging block and excluding the additional paging blocks of the extended monitoring window.

3. The wireless communication device of claim 2, wherein the wireless communication device communicates the extended monitoring window timer in the request message.

4. The wireless communication device of claim 1, wherein the wireless communication device communicates the extended monitoring window indicator to the core network in response to determining that the wireless communication device is capable of monitoring the paging channel of the radio access node using the extended monitoring window.

5. The wireless communication device of claim 4, wherein the wireless communication device determines to use the extended monitoring window if the wireless communication device is capable of supporting the long paging cycle.

6. The wireless communication device of claim 1, wherein the paging blocks of the extended monitoring window are adjacent to the nominal paging block associated with the wireless communication device.

7. The wireless communication device of claim 6, wherein the paging blocks of the extended monitoring window occur before the nominal paging block.

8. The wireless communication device of claim 6, wherein the paging blocks of the extended monitoring window occur after the nominal paging block.

9. The wireless communication device of claim 1, wherein the wireless communication device communicates the extended monitoring window indicator during registration procedures.

10. The wireless communication device of claim 1, wherein the extended monitoring window indicator indicates a number of the additional blocks of the extended monitoring window.

11. A method in a wireless communication device, comprising:
communicating a request message to a core network node, the request message including:
an extended monitoring window indicator indicating that the wireless communication device is capable of using an extended monitoring window to monitor a paging channel of a radio access node, the extended monitoring window comprising one or more paging blocks in addition to a nominal paging block associated with the wireless communication device, the extended monitoring window indicator indicating the additional paging blocks of the extended monitoring window; and
a paging cycle indicator indicating that the wireless communication device monitors the nominal paging block according to a long paging cycle, the long paging cycle having a longer periodicity than that supported by specification 3GPP TS 44.018 version 12.1.0;
receiving a response message from the core network node;
monitoring the paging channel using the extended monitoring window and the long paging cycle if the response message indicates that the core network node supports the extended monitoring window and the long paging cycle;
monitoring the paging channel using the non-extended monitoring window and the long paging cycle if the response message does not indicate that the core network node supports the extended monitoring window but indicates that the long paging cycle is supported; and
monitoring the paging channel using a non-extended monitoring window and a legacy paging cycle if the response message does not indicate that the core network node supports the extended monitoring window and does not indicate that the long paging cycle is supported, the non-extended monitoring window including the nominal paging block and excluding the additional paging blocks, the legacy paging cycle having a periodicity supported by specification 3GPP TS 44.018 version 12.1.0.

12. The method of claim 11, further comprising:
communicating an extended monitoring window timer to the core network node, the extended monitoring window timer associated with the extended monitoring window indicator and specifying a time period for which the wireless communication device uses the extended monitoring window;
starting the extended monitoring window timer in response to a determination that the core network node supports the extended monitoring window;
prior to an expiry of the extended monitoring window timer, monitoring the paging channel using the nominal paging block and the additional paging blocks of the extended monitoring window; and,
after the expiry of the extended monitoring window timer, monitoring the paging channel using a non-extended monitoring window, the non-extended monitoring window including the nominal paging block and excluding the additional paging blocks of the extended monitoring window.

13. The method of claim 12, wherein the extended monitoring window timer is communicated in the request message.

14. The method of claim 11, wherein the extended monitoring window indicator is communicated to the core network in response to determining that the wireless communication device is capable of monitoring the paging channel of the radio access node using the extended monitoring window.

15. The method of claim 14, further comprising determining to use the extended monitoring window if the wireless communication device is capable of supporting Hall the long paging cycle.

16. The method of claim 11, wherein the paging blocks of the extended monitoring window are adjacent to the nominal paging block associated with the wireless communication device.

17. A core network node, comprising:
one or more processors; and,
at least one memory, the memory containing instructions executable by the one or more processors whereby the core network node is operable to:
receive an extended monitoring window indicator from a wireless communication device, the extended monitoring window indicator indicating that the wireless communication device is capable of using an extended monitoring window to monitor a paging channel of a radio access node, the extended monitoring window comprising one or more paging blocks in addition to a nominal paging block associated with the wireless communication device, the extended monitoring window indicator indicating the additional paging blocks of the extended monitoring window;
receive a paging cycle indicator indicating that the wireless communication device monitors the nominal paging block according to a long paging cycle, the long paging cycle having a longer periodicity than that supported by specification 3GPP TS 44.018 version 12.1.0;
update a core network status associated with the wireless communication device to indicate that the wireless communication device is capable of using the extended monitoring window;
send a response message to the wireless communication device;
send page requests to the radio access node for delivery to the wireless communication device according to the extended monitoring window and the long paging cycle if the response message indicates that the core network node supports the extended monitoring window and the long paging cycle;
send page requests to the radio access node for delivery to the wireless communication device according to the non-extended monitoring window and the long paging cycle if the response message does not indicate that the core network node supports the extended monitoring window but indicates that the long paging cycle is supported; and,
send page requests to the radio access node for delivery to the wireless communication device according to a non-extended monitoring window and a legacy paging cycle if the response message does not indicate that the core network node supports the extended monitoring window and does not indicate that the long paging cycle is supported, the non-extended monitoring window including the nominal paging block and excluding the additional paging blocks, the legacy paging cycle having a periodicity supported by specification 3GPP TS 44.018 version 12.1.0.

18. The core network node of claim 17, wherein the page requests indicate that the extended monitoring window is used by the wireless communication device and the additional paging blocks of the extended monitoring window.

19. The core network node of claim 17, further operable to:
receive an extended monitoring window timer from the wireless communication device, the extended monitoring window timer associated with the extended monitoring window indicator and specifying a time period for which the wireless communication device uses the extended monitoring window;
start the extended monitoring window timer;
prior to an expiry of the extended monitoring window timer, send page requests to the radio access node for delivery to the wireless communication device, the page requests indicating that the extended monitoring window is used by the wireless communication device and the additional paging blocks of the extended monitoring window; and,
after the expiry of the extended monitoring window timer:
update the core network status associated with the wireless communication device to indicate that the wireless communication device is not using the extended monitoring window; and,
send page requests to the radio access node for delivery to the wireless communication device using a non-extended monitoring window, the non-extended monitoring window including the nominal paging block and excluding the additional paging blocks of the extended monitoring window.

20. The core network of claim 19, wherein the core network node receives the extended monitoring window timer in the request message.

21. The core network node of claim 17, wherein the paging blocks of the extended monitoring window are adjacent to the nominal paging block associated with the wireless communication device.

22. The core network node of claim 21, wherein the paging blocks of the extended monitoring window occur before the nominal paging block.

23. The core network node of claim 21, wherein the paging blocks of the extended monitoring window occur after the nominal paging block.

24. The core network node of claim 17, wherein the core network node receives the extended monitoring window indicator during registration procedures.

25. The core network node of claim 17, wherein the extended monitoring window indicator indicates a number of the additional blocks of the extended monitoring window.

26. A method in a core network node, comprising:
receiving an extended monitoring window indicator from a wireless communication device, the extended monitoring window indicator indicating that the wireless communication device is capable of using an extended monitoring window to monitor a paging channel of a radio access node, the extended monitoring window comprising one or more paging blocks in addition to a nominal paging block associated with the wireless communication device, the extended monitoring window indicator indicating the additional paging blocks of the extended monitoring window;
updating a core network status associated with the wireless communication device to indicate that the wireless communication device is capable of using the extended monitoring window;
receiving a paging cycle indicator indicating that the wireless communication device monitors the nominal paging block according to a long paging cycle, the long paging cycle having a longer periodicity than that supported by specification 3GPP TS 44.018 version 12.1.0;
sending a response message to the wireless communication device;
sending page requests to the radio access node for delivery to the wireless communication device according to the extended monitoring window and the long paging cycle if the response message indicates that the core network node supports the extended monitoring window and the long paging cycle;
sending page requests to the radio access node for delivery to the wireless communication device according to the non-extended monitoring window and the long paging cycle if the response message does not indicate that the core network node supports the extended monitoring window but indicates that the long paging cycle is supported; and, sending page requests to the radio access node for delivery to the wireless communication device according to a non-extended monitoring window and a legacy paging cycle if the response message does not indicate that the core network node supports the extended monitoring window and does not indicate that the long paging cycle is supported, the non-extended monitoring window including the nominal paging block and excluding the additional paging blocks, the legacy paging cycle having a periodicity supported by specification 3GPP TS 44.018 version 12.1.0.

27. The method of claim 26, wherein the page requests indicate that the extended monitoring window is used by the wireless communication device and the additional paging blocks of the extended monitoring window.

28. The method of claim 26, further comprising:
receiving an extended monitoring window timer from the wireless communication device, the extended monitoring window timer associated with the extended monitoring window indicator and specifying a time period for which the wireless communication device uses the extended monitoring window;
starting the extended monitoring window timer;
prior to an expiry of the extended monitoring window timer, sending page requests to the radio access node for delivery to the wireless communication device, the page requests indicating that the extended monitoring window is used by the wireless communication device and the additional paging blocks of the extended monitoring window; and,
after the expiry of the extended monitoring window timer:
updating the core network status associated with the wireless communication device to indicate that the wireless communication device is not using the extended monitoring window; and,
sending page requests to the radio access node for delivery to the wireless communication device using a non-extended monitoring window, the non-extended monitoring window including the nominal paging block and excluding the additional paging blocks of the extended monitoring window.

29. The method of claim 28, wherein the extended monitoring window timer is received in the request message.

30. The method of claim 26, wherein the paging blocks of the extended monitoring window are adjacent to the nominal paging block associated with the wireless communication device.

* * * * *